Jan. 28, 1969  D. M. DECHERT  3,424,622
FUSED-SALT BATTERY WITH SELF-REGULATING
INSULATING SYSTEM
Filed Feb. 10, 1966

INVENTOR
DOUGLAS M. DECHERT

BY *Kramer & Sturgess*

ATTORNEYS

United States Patent Office 3,424,622
Patented Jan. 28, 1969

3,424,622
FUSED-SALT BATTERY WITH SELF-REGULATING INSULATING SYSTEM
Douglas M. Dechert, Bay Village, Ohio, assignor to The Standard Oil Company, Cleveland, Ohio, a corporation of Ohio
Filed Feb. 10, 1966, Ser. No. 526,613
U.S. Cl. 136—161                               5 Claims
Int. Cl. H01m 1/02

ABSTRACT OF THE DISCLOSURE

An electrical energy storage device operable in a range of low to high temperatures, and utilizing a system which insulates the device from the ambient atmosphere at low temperatures of operation, and dissipates heat from the device into the ambient atmosphere at higher temperatures of operation.

---

This invention relates to a self-regulating insulating system, and more particularly, to a system of providing improved heat transfer characteristics whereby an insulating additive of this invention is placed in an insulating space surrounding an insulated object. The insulating space may or may not contain conventional insulating powders, grains and fibers. The additive facilitates the retention of heat at lower operating temperatures and allows the retained heat to dissipate at higher temperatures. The term "insulating additive" is used herein in its broadest sense to describe a heat transfer material of the present invention.

To combat heat loss, various methods have been suggested in the past. The most common being the substitution of various materials in the insulating area; examples of which are solid bodies (powders), grains and fibers such as asbestos, rock wool and more recently "one shot" polyurethane foams. However, the difficulty with such substances is the lack of flexibility in their use. Such materials are chosen for their high insulating property and fire resistance, almost exclusively, with little consideration given to an environment of high temperature, wherein it is required that heat be dissipated rather than retained. In short, the sole function of such materials, at all temperatures, is to insulate or function as a poor conductor.

Devices so insulated are often expensive to heat and unless endothermic, must be cooled during operation. Often this cooling is by mechanical means as by blowing air across the device. Therefore, it is contemplated by the present invention to provide an insulating or heat transfer system whereby heat is retained at low temperatures to minimize any necessary heat input needed to reach an operating temperature range and the insulating or heat transfer system permits the dissipation of heat at high temperatures to minimize the mechanical cooling means needed to keep the device within the operating temperature range.

It has now been discovered that a superior insulating or heat transfer system is provided, particularly for those applications requiring a heat insulator at low temperatures and a heat conductor at high temperatures, by evacuating the insulating area surrounding an object to be insulated, and placing in the evacuated area an insulating additive, in solid or liquid form, having a low vapor pressure of about 0.001 to about 5.0 mm. Hg at temperatures of from about 250–400° C. and a vapor pressure of about 5 to about 100 mm. Hg at temperatures of from about 450° C. to about 600° C. Commonly, low and high operating temperatures of the device fall within the above temperature ranges, respectively.

Thermal conductivity is often measured in terms of a constant ($k$). At or near atmospheric pressure, the value of $k$, or the thermal conductivity, is independent of the pressure within the insulating space. However, as is recognized in the insulation of a double-wall, vacuum insulated Dewar flask, the partial, mechanical evacuation of air to a pressure of a few millimeters of mercury from a cavity or closed space surrounding the flask proper, can provide considerable insulation for the flask. Again, though, the partially evacuated space has a substantial insulating effect at all temperatures. However, at high temperature, radiation plays an important role in the transfer of heat. Therefore, powders, fibrous or granular materials are often added to an air evacuated insulating space, thus reducing the heat transfer by radiation. Notwithstanding the high temperature radiation losses, and the placement of insulating materials within the insulating area, in order for such a space, partially evacuated of air, to function as an insulator at certain temperatures and a conductor at other temperatures, it is necessary to first mechanically evacuate the air from the closed space at the lower operating temperature ranges and, secondly, mechanically induce air into the closed space at higher operating temperature ranges. However, such a procedure is not economically practical. By the method of the present invention of introducing into the partially evacuated insulating area an insulating additive of the type herein contemplated the mechanical evacuation and introduction of air into the insulating area is obviated.

It has been found that as the pressure within the closed insulating space is reduced, and insulating additive introduced into the insulating area, thermal conductivity becomes dependent upon the vapor pressure of the insulating additive, as is typified by the graph showing mm. Hg plotted against thermal conductivity of various substances at low pressures. Stated alternatively, if an insulating additive is placed in the closed space and a partial vacuum established in the order of a few millimeters of mercury, the thermal conductivity is dependent upon the vapor pressure of the insulating additive as the system approaches absolute zero, or a point at which the insulating additive is in a vacuum and therefore there is no vapor pressure within the closed area.

Therefore, it is considered that, depending on the requirements of operation of the object being insulated, the particular vapor pressures of the insulating additive at various temperatures can be determined, as shown by the accompanying table and Perry's Chemical Engineering Handbook, 3d edition, pp. 150–165, preferred of which are the inorganic compounds of pages 150–152.

Thus, it is contemplated that by the present invention, a blend of insulating additives and conventional insulating materials is possible whereby, depending on the required heat release path of the insulated object and the environment of the insulated object, heat transmission from the object can be carefully controlled so as to provide low heat release at low temperatures and high heat release at high temperatures.

Since the present invention is applicable to any low pressure insulating system, the following description is offered only by way of example and is not to be considered as limiting the invention, nor is it to be considered a sole application of the invention.

Figure 1:
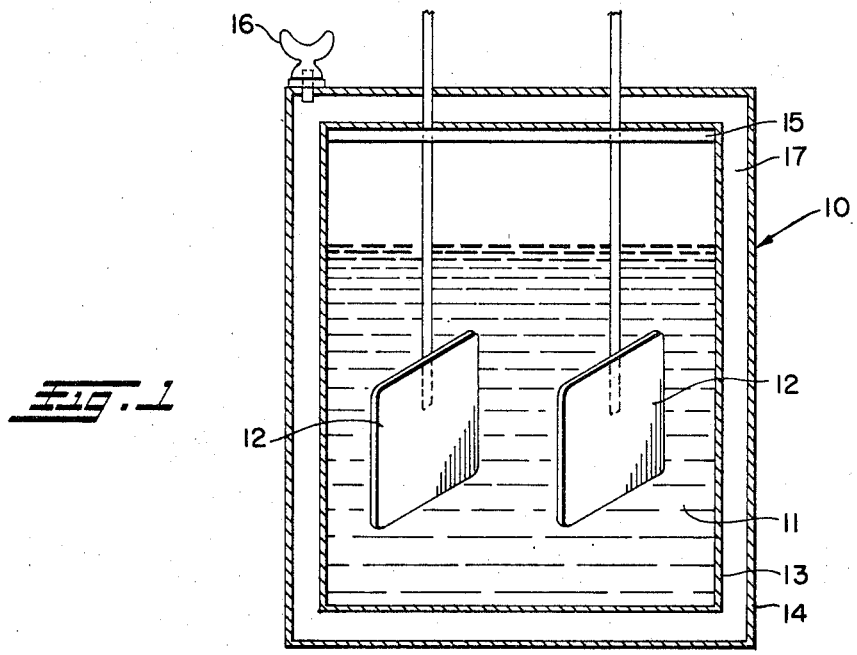
FIGURE 1 is a cross sectional view of an insulated fused salt electrical energy storage device.
Figure 2:
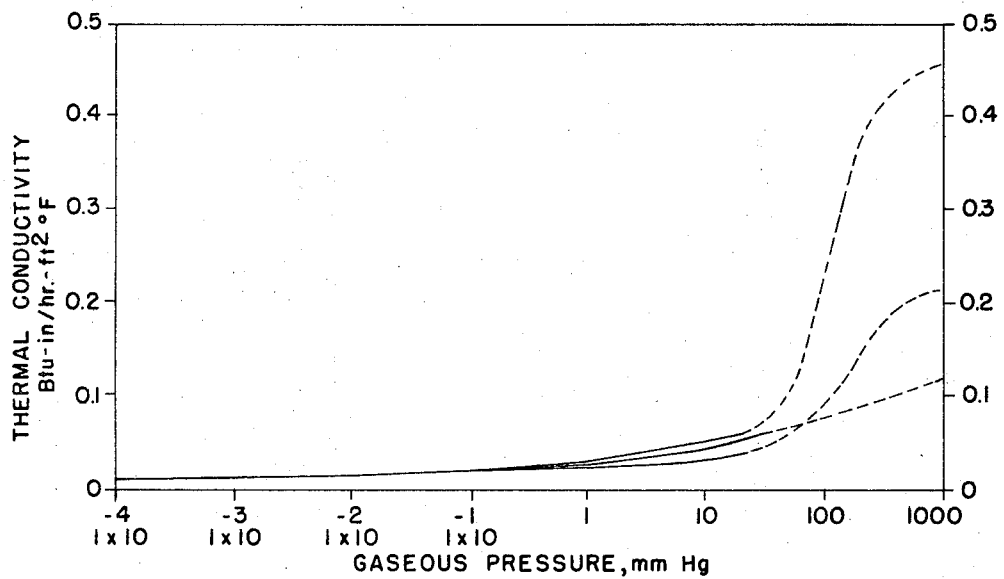
FIGURE 2 is a graph showing gas pressure plotted against thermal conductivity for various substances.

Referring more particularly to the drawings, an exemplary application of the invention is shown as used in an electric energy storage device 10 with a molten salt electrolyte 11 and electrodes 12. The molten salt, and consequently the subject electric energy storage device, normally operates in the range of temperatures from 300° C. to 1000° C. While the device is not in use, it is desirable to maintain the temperature of the device at the lower end of this temperature range; thus it is desirable that the electrical energy storage device be insulated from heat transfer by a poor conductor so that the electrolyte is kept well insulated. On the other hand, when the cell is in operation, the temperatures of the device approach the upper end of the above-mentioned temperature range due to internal electrical resistance. Therefore, it is highly desirable, and in fact imperative, that heat be dissipated to prevent decomposition or destruction of the internal components of the device, i.e. the electrolyte. Heat dissipation is also necessary to prevent distortion or warpage of the electrodes if too broad a temperature range is used. For the purposes of insulating an electrolyte of a molten salt, it is desirable that the insulating additive have a vapor pressure of from about 0.01 to 0.1 mm. Hg in a temperature range of from about 250° C.–350° C. and from about 10 to 50 mm. Hg in a temperature range from about 450° C. to about 550° C. The insulating additives, through the effect of vapor pressures, provide the necessary insulation at the lower temperatures and conduction at higher temperatures. Specific materials that have proven useful in this application include cadmium iodide, phosphorous pentoxide, cadmium and zinc chloride, the vapor pressures of which are shown in the following table;

TABLE

|  | 350° C. | 400° C. | 500° C. |
|---|---|---|---|
| Zinc chloride (mm. Hg) | 0.1 | 0.5 | 10.0 |
| Cadmium iodide | 0.15 | 0.6 | .8 |
| Phosphorous pentoxide | 0.2 | 2.0 | 80.0 |
| Cadmium | 0.3 | 1.0 | 13.0 |

Electrolyte 11 is held in a container 13 which is encased in a support case 14 the surfaces of which are parallel to, but spaced apart from the corresponding surfaces of the container 13, so that a space or void 17 is created between the container 13 and the case 14. The electrodes are sealable from the insulating area by insulating seal 15. In some cases the void 17 is filled with a powdered, fibrous or granular conventional insulating material in addition to the insulating additive. Valve means 16 in the case provides a means of communication between the void or space and the atmosphere.

The electrolyte used in the electric energy storage device herein described comprises a source of ions which are mobile, and most commonly, in the molten state at temperatures in the range of 350° C. to 1000° C., and which electrolyte is derived from crystalline materials characterized by predominantly ionic latice when in the crystalline state and can be disassociated to provide the requisite ion content and mobility in the molten state. When heated above their melting point, the crystalline compounds, or mixtures thereof, are considered as dissolved in each other, and each of the components of the crystalline material provides mobile ions. The mobile ions of the preferred embodiment of the invention are alkali metal halide ions.

Typical examples of materials which can be used as electrolytes include salts of metals, and mixtures of such salts, and particularly eutectic mixtures thereof, as for example binary systems of LiCl–KCl, KCl–MgCl$_2$, MgCl$_2$–NaCl, LiBr–LiF, LiF–RbF, MgCl$_2$–RbCl; and ternary systems, as for example, CaCl$_2$–LiCl–KCl, LiCl–KCl–NaCl, CaCl$_2$–LiCl–NaCl and LiF–NaF–RbF. A particularly useful electrolyte is a molten salt comprising lithium bromide and potassium bromide, or a molten salt comprising lithium chloride and potassium chloride having a composition of about 59 mole percent lithium chloride and 41 mole percent potassium chloride. This is an eutectic which melts at 352° C. Other electrolytes can be used, as for example, aluminum chloride-alkali metal chloride. This mixture forms an eutectic at a molar ratio of about 1.0:1:0 which melts at about 80° C.

Since the electric energy storage device operates at or above the fusion temperature of the electrolyte, the above-mentioned electrolytes are provided a means of heating to insure their remaining in the molten state. One means of heating is by use of a Nichrome wire or tape wound around or surrounding the container holding the electrolyte.

Immersed in the electrolyte are electrodes spaced apart and opposed to one another, which electrodes coact with the electrolyte to establish an electrical potential when an electrical resistance load is placed across the electrodes.

The electrodes of the device are composed of any suitable material as for example, the anode (negative) can be a metal such as zinc, calcium, aluminum, lead or iron, and the opposed electrode can be a porous, activated carbon material.

Active carbon is generally prepared in a two-step process comprising formation of a porous, amorphous base carbon at a relatively low temperature, followed by the removal of adsorbed hydrocarbons from the primary carbon, thereby increasing the porosity. Step one involves distillation at a relatively low temperature.

Step two involves the removal of adsorbed hydrocarbons by combined oxidation and distillation, involving steam alone, or steam in air; the hydrocarbons of high boiling points are broken down into more volatile substances easily removed at low temperatures and under conditions less likely to result in the deposition of secondary carbon, which is inactive. During the removal by oxidation and distillation of the hydrocarbons, a loss of primary carbon by oxidation occurs; the conditions of activation must, therefore, be so chosen that the hydrocarbons are oxidized rapidly, the primary carbons slowly.

In the steam-activiation process, the carbon from step one is placed in an upright steel tube top feed and bottom discharge. Superheated steam enters and streams downward through the carbon, carrying away the undesired hydrocarbons before they can be decomposed by the high temperature and deposite inactive carbon. In step two, by both methods, the temperature is maintained at about 350° C.–400° C.

In operation, atmospheric air is evacuated from the void 17 by attaching a vacuum pump (not shown) to the valve 16. Upon the removal of the atmospheric air from the void 17, the valve 16 is closed and the vacuum pump disconnected from the valve. Subsequently an insulating additive, as herein described, is introduced into the void 17. The insulating additive introduced into the void 17, because of its low vapor pressure at lower operating temperatures, acts as a poor conductor and a good insulator; and because the insulating additive introduced into the void 17 has a high vapor pressure at higher temperatures, the insulating additive acts as a good conductor or poor insulator at these higher temperatures.

Having described the invention, the following is offered as distinctly and particularly claiming the invention.

What is claimed is:

1. In combination:
   (a) an outer chamber sealed from the ambient atmosphere;
   (b) an inner chamber at least partially disposed within the outer chamber and sealed therefrom;
   (c) a fused salt electrolyte disposed in the inner chamber;
   (d) means for maintaining said electrolyte in a molten state;
   (e) a pair of spaced electrodes immersed in the electrolyte and forming therewith an electrical energy storage device which gives off heat at varying temperatures within a predetermined range of operating temperatures;
   (f) means disposed in said outer chamber and responsive to heat given off during the operation of said electrical energy storage device, said means insulating said inner chamber from the ambient atmosphere at lower operating temperatures within said predetermined range of operating temperatures, and dissipating heat from said inner chamber into the ambient atmosphere at higher operating temperatures within said predetermined range of operating temperatures, said means including a vaporable insulating additive having:

(g) a vapor pressure which increases in direct response to higher temperatures of heat given off by said electrical energy storage device; and (h) a range of varying vapor pressures in predetermined relation to the predetermined range of operating temperatures of said electrical energy storage device.

2. The combination of claim 1, which includes an insulating material disposed in the outer chamber in addition to the additive.

3. The combination of claim 1, wherein the range of vapor pressures of said additive is from about 0.001 mm. Hg to about 5.0 mm. Hg for temperatures ranging from about 250° C. to about 400 C., and from about 5 mm. Hg to about 100 mm. Hg for temperatures ranging from about 450° C. to about 600° C.

4. The combination of claim 1, wherein the range of vapor pressures of said additive is from about 0.01 mm. Hg to about 1.0 mm. Hg for temperatures ranging from about 250° C. to about 350° C., and from about 10 mm. Hg to about 50 mm. Hg for temperatures ranging from about 450° C. to about 550° C.

5. The combination of claim 1, wherein the additive is a solid or liquid selected from the group consisting of cadmium iodide, phosphorous pentoxide, cadmium, and zinc chloride.

References Cited

UNITED STATES PATENTS

| | | | |
|---|---|---|---|
| 1,266,780 | 5/1918 | Edison | 136—161.2 |
| 3,110,633 | 11/1963 | Bachmann | 136—161 |
| 3,167,159 | 1/1965 | Bovenkerk | 215—13 XR |

WINSTON A. DOUGLAS, *Primary Examiner.*

D. WALTON, *Assistant Examiner.*

U. S. Cl. X. R.

215–13; 220—9